(12) United States Patent
Bajorek (10) Patent No.: US 6,718,612 B2
(45) Date of Patent: *Apr. 13, 2004

(54) METHOD FOR MANUFACTURING A MAGNETIC DISK COMPRISING A GLASS SUBSTRATE USING A PROTECTIVE LAYER OVER A GLASS WORKPIECE

(75) Inventor: Christopher H. Bajorek, Los Gatos, CA (US)

(73) Assignee: Asahi Glass Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/565,871

(22) Filed: May 5, 2000

(65) Prior Publication Data
US 2002/0053121 A1 May 9, 2002

Related U.S. Application Data (63) Continuation-in-part of application No. 09/369,030, filed on Aug. 4, 1999, now Pat. No. 6,363,599.

(51) Int. Cl.[7] .................................................. B23P 17/00
(52) U.S. Cl. ........................ 29/424; 29/527.2; 427/154; 451/30; 65/23
(58) Field of Search ................................. 29/527.2, 412, 29/424; 360/135; 427/154, 289; 428/43, 167; 451/30, 41, 44, 439; 65/23, 61; 83/169

(56) References Cited

U.S. PATENT DOCUMENTS

| | | | |
|---|---|---|---|
| 3,453,097 A | * | 7/1969 | Hafner |
| 3,899,314 A | * | 8/1975 | Siegmund |
| 4,239,712 A | * | 12/1980 | Neefe |
| 4,360,544 A | * | 11/1982 | Franz et al. |
| 4,718,202 A | * | 1/1988 | Worsham |
| 5,128,281 A | * | 7/1992 | Dyer et al. |
| 5,128,922 A | * | 7/1992 | Inui et al. |
| 5,486,276 A | * | 1/1996 | Kitamoto et al. |
| 5,538,579 A | * | 7/1996 | Ishimura et al. |
| 5,622,540 A | * | 4/1997 | Stevens |
| 5,678,744 A | * | 10/1997 | Nakamura |
| 5,816,897 A | * | 10/1998 | Raeder et al. |
| 5,826,772 A | * | 10/1998 | Ariglio et al. |
| 6,096,405 A | * | 8/2000 | Takahashi et al. |
| 6,491,972 B1 | * | 12/2002 | Weber et al. |

* cited by examiner

*Primary Examiner*—Douglas Olms
*Assistant Examiner*—Steven A. Blount
(74) *Attorney, Agent, or Firm*—Oblon, Spivak, McClelland, Maier & Neustadt, P.C.

(57) ABSTRACT

A method for manufacturing a glass substrate for use in magnetic disk manufacturing comprises the steps of a) forming a glass sheet; b) forming a protective sheet over one or both sides of the glass sheet; c) cutting the glass sheet into workpieces; d) cutting the workpieces into disk-shaped substrates; e) subjecting the edges of the substrates to an edge polishing process; and f) removing the protective layer. Of importance, by leaving the protective layer over the substrate, the substrate surface is protected from damage.

17 Claims, 7 Drawing Sheets

METHOD FOR MANUFACTURING A MAGNETIC DISK COMPRISING A GLASS SUBSTRATE USING A PROTECTIVE LAYER OVER A GLASS WORKPIECE

CROSS-REFERENCE TO RELATED APPLICATIONS

This Application is a continuation-in-part of U.S. patent application Ser. No. 09/369,030, filed Aug. 4, 1999 now U.S. Pat. No. 6,363,599. The '030 application is incorporated herein by reference.

BACKGROUND OF THE INVENTION

This invention pertains to methods for making magnetic disks comprising glass substrates. This invention also pertains to methods for making glass substrates. This invention also pertains to methods for processing sheets of glass into workpieces.

Figure 1:
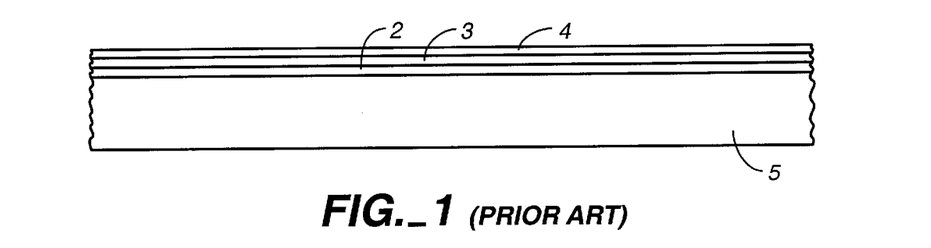
FIG. 1 illustrates a magnetic disk comprising a glass substrate manufactured in accordance with the prior art.

It is known in the art to manufacture magnetic disks (e.g. disk 1 of FIG. 1) by sputtering an underlayer 2 (e.g. Cr or a Cr alloy); a magnetic alloy 3 (e.g. Co, a Co alloy or a Fe alloy); and a protective overcoat 4 (e.g. carbon) on a disk-shaped glass substrate 5. Substrates used in the manufacture of magnetic disks must be extremely flat and smooth. Accordingly, a great deal of effort and expense is taken to polish glass during the manufacture of substrates.

A typical process for manufacturing glass substrates is as follows.

Figure 2:
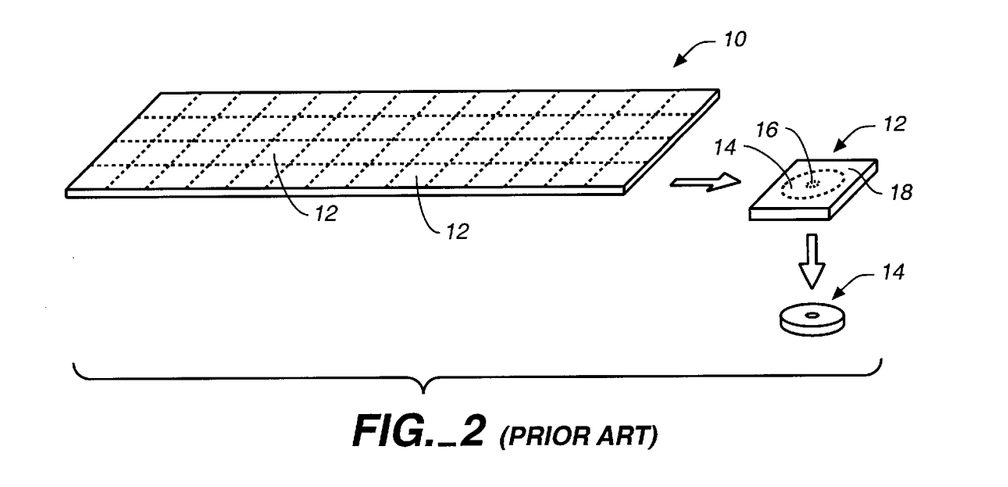
FIG. 2 illustrates a process flow for manufacturing glass substrates in accordance with the prior art.
Figure 3:
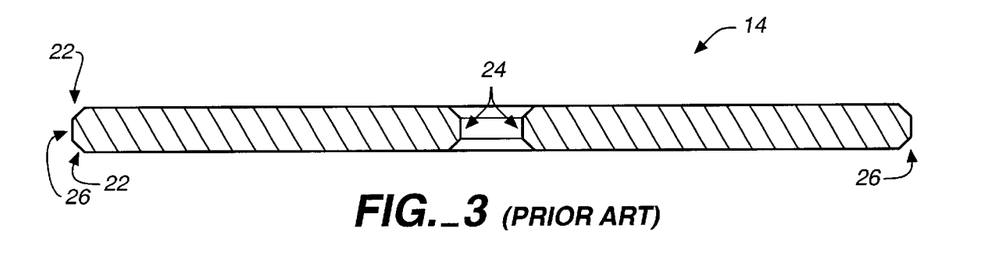
FIG. 3 illustrates in cross section a glass substrate in accordance with the prior art including chamfered edges.

1. First, a sheet of glass 10 (FIG. 2) is formed using a float or draw method. Glass produced by these methods is typically very smooth.
2. Glass sheet 10 is cut into individual squares 12 (typically 100 mm by 100 mm, with a thickness of about 1 mm).
3. Thereafter, disk-shaped substrates 14 are cut out of squares 12. This requires cutting a centrally defined circular inner portion 16 and an outer portion 18 away from squares 12. This is accomplished using a sawing process or a scribing and breaking process.
4. Chamfers 22 are formed at the inner and outer diameter edges 24, 26 of substrate 14. (FIG. 3 illustrates substrate 14 in cross section, and shows chamfers 22.) Forming chamfers 22 requires multiple lapping and polishing steps.
5. Substrates 14 are then finished so that their surfaces are very smooth and have few or no defects. This is accomplished through one or more lapping or grinding steps and one or more polishing steps.

The grinding, lapping and polishing steps described above are extremely time consuming and expensive. During these steps, as much as 250 to 1000 $\mu$m of glass are removed to ensure that the resulting substrate is extremely flat and smooth, e.g. having an Ra of about 2 to 4 Å. (Typically, glass as formed by the float or draw methods is very smooth, but not very flat. Chamfering and various manufacturing steps described above introduce scratches and damage into the glass surface. Thus, polishing is performed to a) make the substrates flat, and b) cause the glass to once again be smooth.) To do this, the polishing steps add a great deal of manufacturing cost to the substrates. It would be desirable to find a way to eliminate the need for such polishing.

It is also known to use glass to manufacture LCD displays. An example of such a method is discussed in U.S. Pat. No. 5,622,540, issued to Stevens. Stevens provides a protective overcoat over a glass workpiece, and then scribes and breaks his workpiece as part of an LCD display manufacturing process.

Applicant is aware of another LCD glass manufacturing process (used by a company outside the United States) that comprises covering glass sheets with a protective layer, and then placing the glass sheets vertically in a holder that is used to transport them to the next work station. Interestingly, this process is used by a manufacturer that manufactures both glass magnetic disk substrates and glass for LCD displays. When manufacturing glass for magnetic disk substrates, the manufacturer did not apply a protective overcoat to glass sheets.

The reason for the difference in the way glass was handled during LCD display manufacturing and glass disk substrate manufacturing is that during disk substrate manufacturing, disks are subjected to extensive polishing and lapping. (This is particularly true because such lapping and polishing is necessitated by the chamfering steps.) Thus, there was no perceived reason for providing protective overcoats to glass used for disk substrate manufacturing, since the glass would be extensively lapped and polished anyway.

Applicant is also aware of a coring process wherein several square or rectangular sheets of glass are stacked and bonded together with an adhesive. The coring is done using saw like instruments to cut out the inner diameter opening and to cut out the disks from the squares. The adhesive is necessary so that all of the squares in the stack remain stationary during this operation.

In any event, it would be desirable to provide a glass substrate manufacturing process with reduced or minimized lapping to thereby reduce manufacturing costs.

SUMMARY

It has been discovered that one of the reasons such extensive polishing is required during the manufacture of magnetic disks is that glass splinters lodge on the surface of the glass during the various manufacturing steps described above. These splinters scratch and damage the glass surface, thereby necessitating extensive lapping and polishing. By providing a protective layer over the glass during the various manufacturing steps, the need for such extensive processing is minimized.

In one embodiment, in lieu of chamfering the substrate edges, the substrate edges are rounded with an edge polishing technique. Whereas in the prior art, it was a foregone conclusion that the substrate would have to undergo extensive lapping and polishing (e.g. as a result of chamfering), it has been discovered that such lapping an polishing can be substantially avoided or minimized. Because of this, in a process in accordance with the present invention, it is now advantageous to protect a glass workpiece with a protective layer.

In accordance with one embodiment of the present invention, a protective layer is formed at the beginning of a glass manufacturing process, e.g. when the glass is in the form of a sheet. The protective layer is then removed after the glass is put into its final form (e.g. a glass substrate for disk manufacturing). Thus, in this embodiment, the protective layer stays on the glass through much or all of the substrate manufacturing process, and is removed at or near the end of the substrate manufacturing process.

In accordance with another embodiment of the present invention, the protective layer is placed on a glass workpiece before the workpiece is subjected to a process step during which the workpiece can be damaged. After the process step, the protective layer can be removed. This process step can be sawing, scribing, breaking, transporting the glass from one work station to another, edge polishing substrates, stacking substrates, chamfering substrates (e.g. using a laser or mechanical means), or other process step. Protective overcoats can be placed on the glass and removed from the glass at several times during the manufacturing process. In accordance to some embodiments of the invention, a protective overcoat can be place on a workpiece during single-workpiece processing or transportation.

One embodiment of a method in accordance with the invention begins with the step of providing a glass sheet. The glass sheet is typically formed by the float method. However, the glass sheet can be formed by other techniques such as drawing.

One and typically both sides of the glass sheet are then covered with a protective layer. The protective layer can be a polymer or other material, and protects the surface (or surfaces) of the glass sheet from splinters and other contaminants. Of importance, the protective layer prevents the surface of the glass sheet from being scratched by these particles.

After being covered with a protective layer, in one embodiment, the glass sheet is cut into smaller workpieces. This can be done by any of a number of methods, e.g., sawing or scribing and breaking. For the case of scribing and breaking, the scribing can be performed mechanically (e.g. using a diamond scribe tool). Alternatively, radiant energy (e.g. a laser) can be used to scribe the glass sheet. (Portions of the protective layer are typically burned away during laser scribing. During mechanical scribing or cutting, portions of the protective layer are typically cut. However, the protective layer remains on, and continues to protect, the portions of the glass workpieces that eventually serve as the major surfaces of the substrates being formed.)

In one embodiment, after laser scribing, the glass sheet is subjected to an acidic etching solution comprising fluoride ions. It has been discovered that this etching solution preferentially attacks the portions of the sheet that have been exposed to the laser. Because of this, the edges of the workpiece are smoother and better defined than they would be using other scribing and breaking techniques.

In one embodiment, both sides of the glass sheet are scribed simultaneously. This also improves the definition of the edges of the resulting smaller workpieces.

After the above-mentioned cutting or scribing and breaking process, individual substrates are cut out of the smaller workpieces. This can be accomplished using any of the techniques described above for cutting the glass sheet into smaller workpieces. Of importance, the protective layer remains on the workpieces during this process, and continues to protect the workpieces from being scratched.

Thereafter, chamfers are formed on the substrates. This can be performed in several different ways. For example, in one embodiment, the chamfers are formed using a laser cutting technique. In another embodiment, in lieu of forming chamfers, the corners of the substrate are rounded using an edge polishing technique. This process is performed by applying an edge polishing material (e.g. a slurry containing $CeO_2$ or other edge polishing material) to the edge of the substrate. As explained below, this polishes the substrate edge and rounds the corners of the substrate.

In one embodiment, several substrates are stacked, and their edges are polished simultaneously. Of importance, the protective layer remains on both sides of each of the substrates, and continues to protect the substrates during this process. The substrates are then destacked.

It is at this point in the process that the protective layers are removed from the substrates. Of importance, because the protective layers have been on the substrates throughout the above-mentioned processing steps, the substrates are smooth and unscratched. Only minimal polishing (if any) is needed to put the substrates in condition for disk completion. The disks are typically completed by depositing, e.g. by sputtering, an underlayer, magnetic layer and protective overcoat, in that order, on the substrates. A lubricant layer is then applied to the protective overcoat.

DETAILED DESCRIPTION

I. First Embodiment

Figure 4:
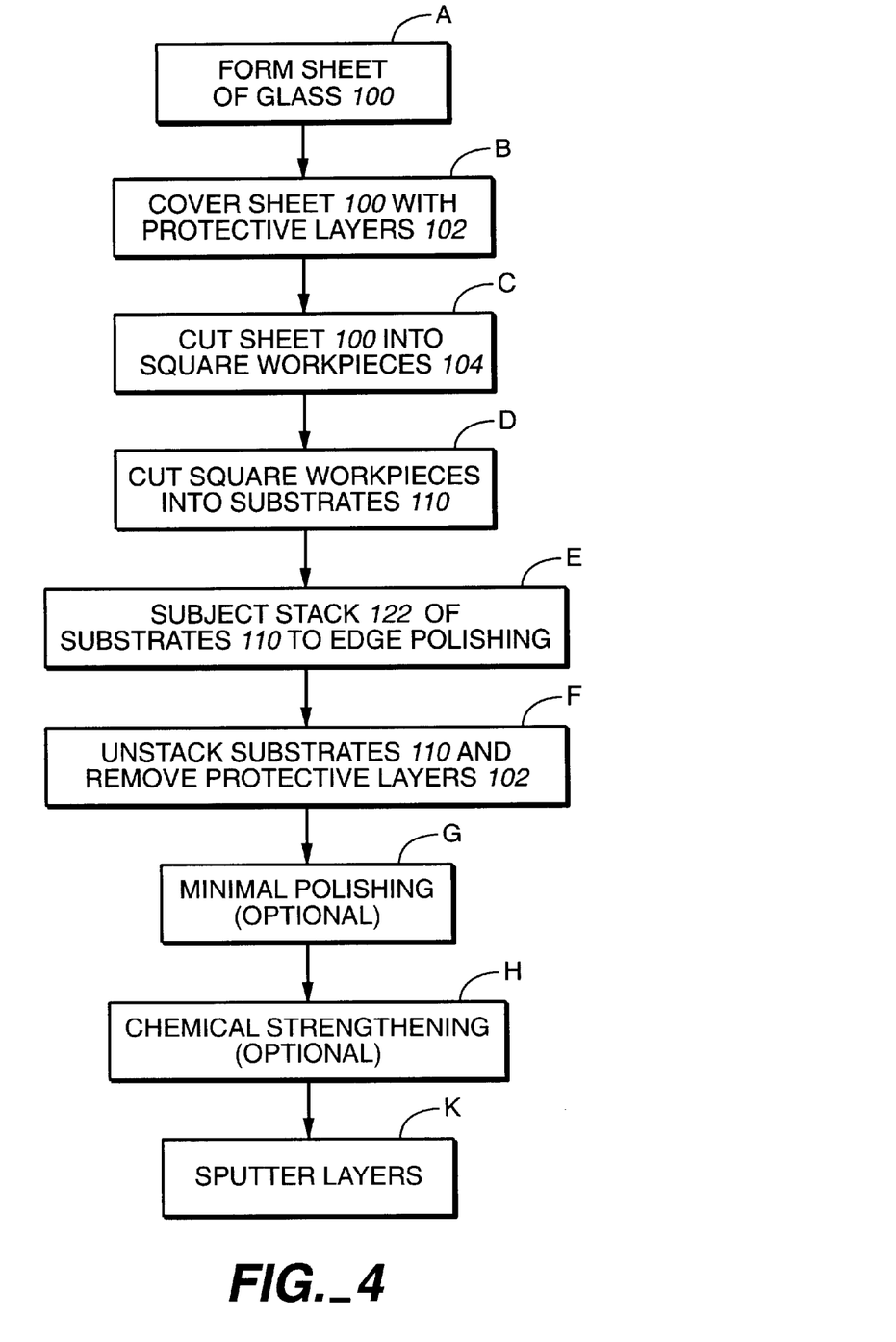
FIG. 4 illustrates a process flow for manufacturing a glass substrate in accordance with the present invention.

A method in accordance with the invention begins with the step of forming a glass sheet 100 (step A in FIG. 4). In one embodiment, glass sheet 100 (FIG. 5) is formed by the float method, but other techniques such as drawing can be used. As used herein, the term "drawing" includes down drawing, overflow fusion drawing (e.g. as described in U.S. Pat. No. 3,338,696, issued to Dockerty, incorporated herein by reference), and similar processes. See also U.S. Pat. No. 3,682,609, issued to Dockerty. (The '696 and '609 patents are incorporated herein by reference.) The glass is typically a silicate glass, e.g. aluminosilicate or borosilicate, but other types of glasses without additives or with different or additional additives, can be used as well.

Figure 5:
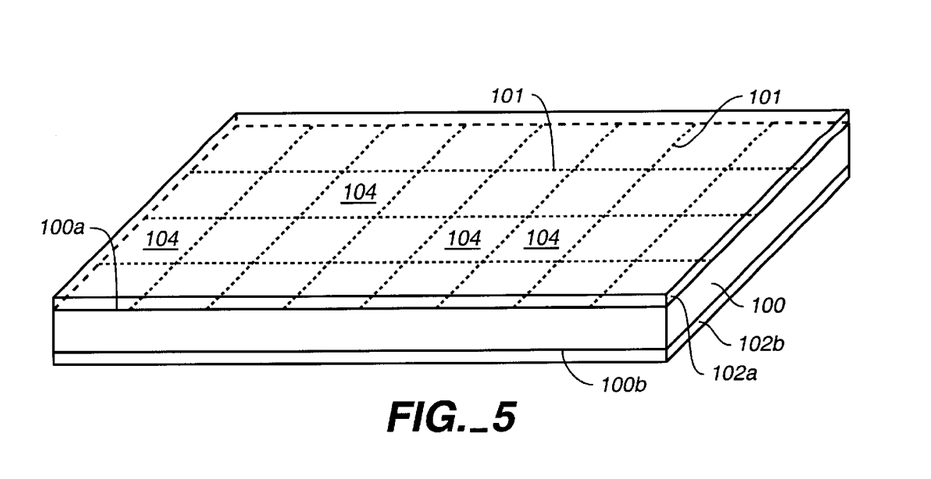
FIG. 5 illustrates a glass sheet covered by protective layers.

Top and bottom surfaces 100a and 100b of glass sheet 100 are covered with protective layers 102a and 102b, respectively (step B of FIG. 4). In one embodiment, protective layers 102 are a water-soluble material such as latex. In another embodiment, layers 102 are a polymer that is not water-soluble. Of importance, protective layers 102 protect glass sheet 100 from being damaged during subsequent manufacturing processes. (In one embodiment, a protective layer is applied to only one side of glass sheet 100. This may be particularly practical for the production of magnetic disks having a magnetic layer on only one side of the substrate. Therefore, the quality of the other side of the substrate may not be very critical.)

Glass sheet 100 is then cut into individual workpieces 104 (step C). Workpieces 104 are typically square shaped, measuring 100 mm by 100 mm, and are typically 1 mm thick, but can be other shapes or sizes. Sheet 100 can be cut into workpieces 104 by sawing. Alternatively, sheet 100 can be cut into workpieces by scribing and breaking. Scribing can be accomplished by mechanically scribing sheet 100 using a diamond-scribing tool, laser scribing or laser scribing followed by etching (e.g. as discussed below). (FIG. 5 illustrates in phantom scribe lines 101 formed on glass sheet 100 during this scribing operation. Although FIG. 5 only shows sheet 100 as being five squares wide, sheet 100 can be many meters wide, and many tens of meters long. Thus, sheet 100 can contain many more squares 104 than are illustrated.) During diamond or laser scribing, protective layers 102 are typically cut by the diamond scribing tool or burned by the laser where the scribe line is being formed, but layers 102 otherwise remain intact during this process.

In one embodiment, glass sheet 100 is diamond or laser scribed on both sides of sheet 100. This results in improved edge profiles for reasons described in U.S. patent application Ser. No. 09/407,003 filed Sep. 28, 1999 by Hsieh et al., incorporated herein by reference. After diamond or laser scribing, glass sheet 100 is broken along the scribe lines into individual glass squares 104.

After glass sheet 100 is formed into square workpieces 104, glass substrates 110 are cut out of the workpieces 104 (step D). In one embodiment, this is accomplished by sawing, laser scribing and breaking. The substrates can have an outer diameter of about 95 mm, but other sizes can also be used.

In one embodiment, a laser beam (e.g. from a $CO_2$ laser) traces a scribe line on the workpiece, followed by application of a cold fluid (e.g. a cold gas or liquid) to the laser-scribed material and a subsequent etching step. See U.S. patent application Ser. No. 09/407,630, filed Sep. 28, 1999 by Hsieh et al., incorporated herein by reference. During this process, after laser scribing, sheet 100 is subjected to a fluoride containing acidic solution, e.g. hydrofluoric acid. Alternatively a solution of ammonium bifluoride and an acid such as $H_2SO_4$ can be used. One example of such a solution comprises 5 wt. % ammonium bifluoride, 5% by volume $H_2SO_4$ at room temperature, and a surfactant such as toluene sulfonic acid. (This material is sold as Eltesol TSX/A, manufactured by Albright & Wilson Corp.) Etching can be accomplished while the solution is ultrasonically agitated, e.g. at a frequency between 28 and 68 KHz. In one embodiment, the solution is agitated at 40 KHz. The '630 Application explains that the above-mentioned process provides smooth scribe mark structures that are particularly advantageous for providing precise definition during scribing and breaking.

Figure 6:
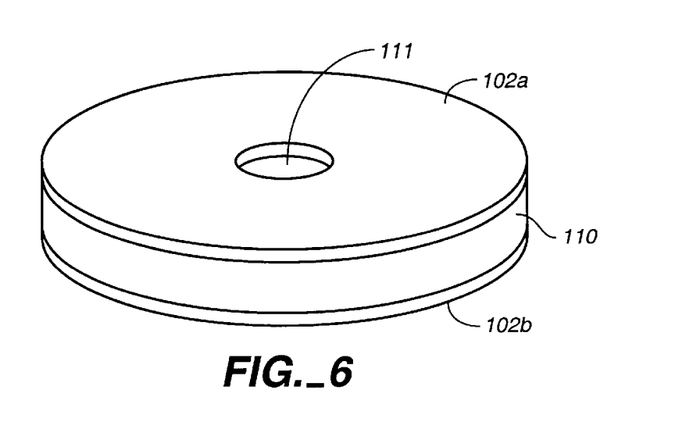
FIG. 6 illustrates a glass substrate formed from the glass sheet of FIG. 5.

As can be seen in FIG. 6, substrates 110 are disk-shaped, and have an inner circular hole 111 formed therein. Hole 111 is typically formed by scribing and breaking as described above. As described below, hole 111 is used to mount the completed disk onto a spindle in a disk drive. FIG. 6 also shows that a portion of protective layers 102a, 102b remains on the top and bottom surfaces of substrate 110 at this point in the manufacturing process. Thus, protective layers 102a, 102b continue to protect the major surfaces of substrate 110.

Figure 7:
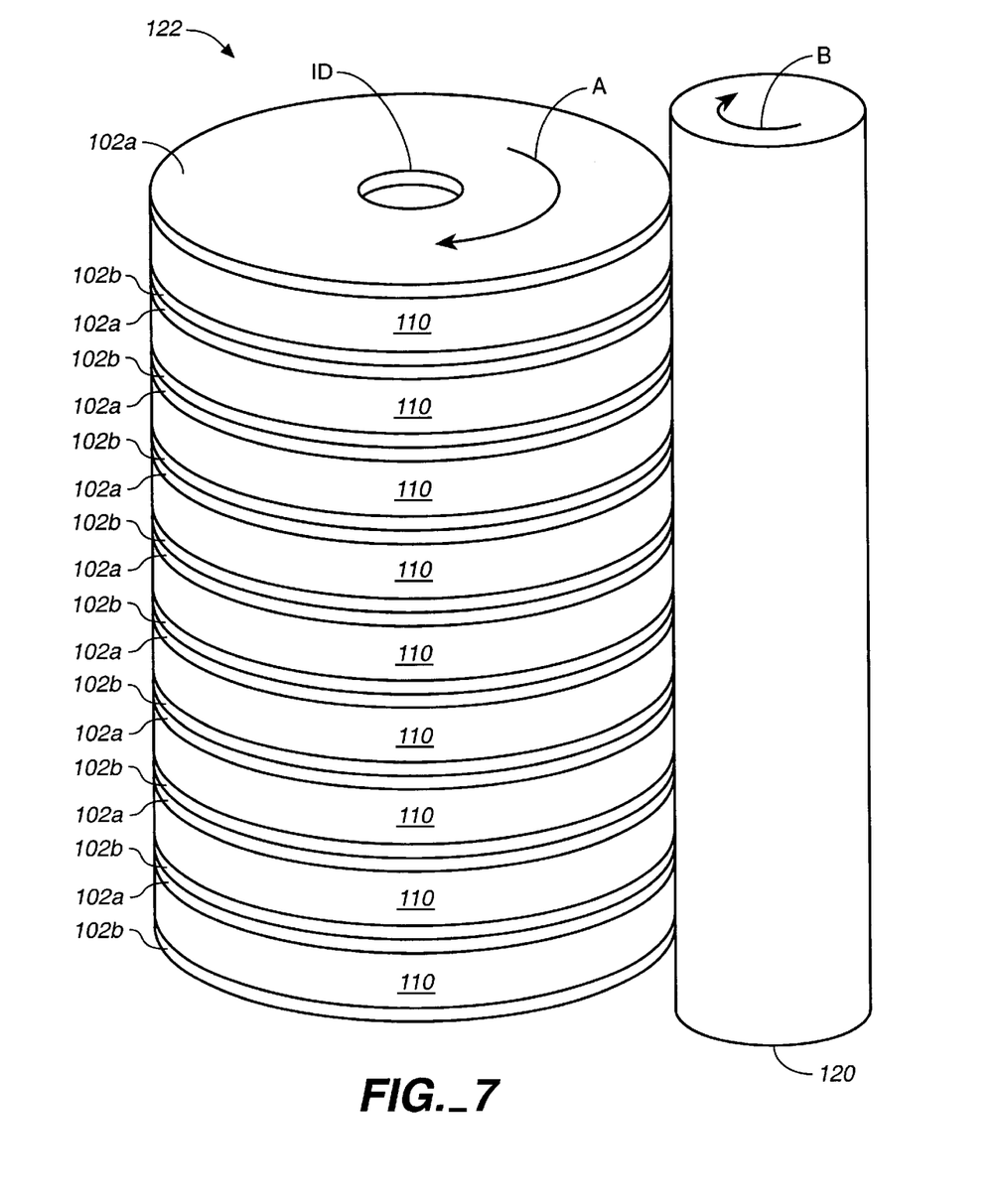
FIG. 7 illustrates a stack of substrates being subjected to edge polishing.

Glass substrates 110 may then be subjected to an edge polishing technique, e.g. as discussed in parent application Ser. No. 09/369,030 (step E of FIG. 4). In one embodiment of this process, substrates 110 are stacked, e.g. as shown in FIG. 7. One advantage of using a sheet of material as a protective layer is that the thickness of the sheet is generally well controlled. By having a repeatable amount of space between all workpieces, in a given stack and from stack to stack, the edge profile is well controlled and repeatable.

Optionally, substrates 110 can be bonded with an adhesive during stacking. The adhesive can be the protective layer. In embodiments where the adhesive functions as a protective layer, it preferably comprises at least a component that is substantially solid or highly viscous prior to stacking substrates 110. This component prevents glass splinters that may be present from moving against and thereby scratching the major surface of substrates 110. The adhesive-coated substrates can be bonded together by e.g. a) heat-fusing the adhesive layers on the various substrates; b) using a sufficiently viscous adhesive so as to prevent excessive movement of any particles that may be present; or c) applying a solvent that temporarily liquefies a surface portion of the adhesive-coated substrate to thereby bond the adhesive coatings on the substrate. This is particularly useful during coring operations (described below) where significant forces act on the workpieces, which would otherwise cause the individual workpieces to move with respect to one another. If an adhesive is used during an edge polishing process, it is desirable that the adhesive can be placed between the workpieces with consistent thickness for the reasons discussed above.

Figure 8:
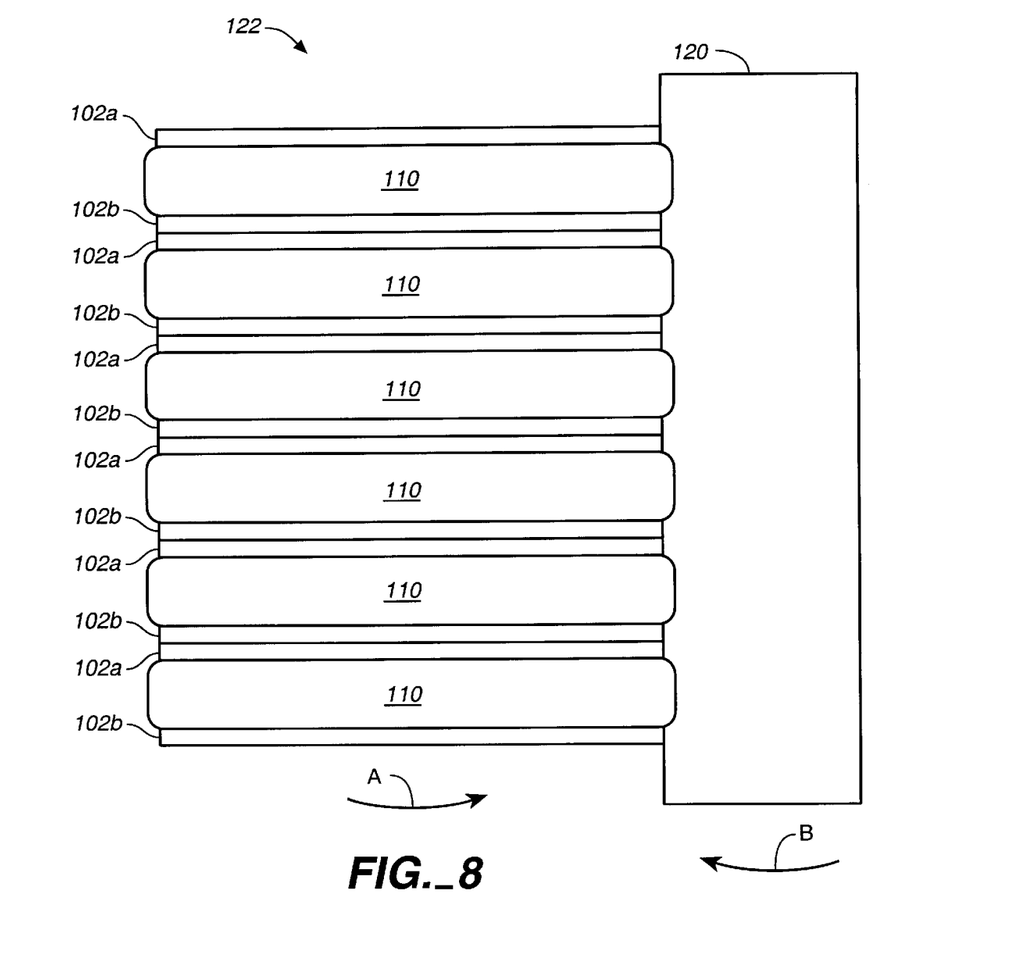
FIG. 8 is an expanded view of the stack of substrates of FIG. 7 being subjected to the edge polishing step, showing the manner in which the edges of the substrates are rounded during edge polishing.

The edges of substrates 110 are then subjected to a chemical mechanical polishing ("CMP") process. During this process, a polishing slurry, e.g. a slurry comprising particles such as $CeO_2$, is applied the stack. The slurry can be applied to the substrates using a polishing pad 120. (The slurry is typically introduced between pad 120 and stack 122.) This has two major advantages:

1. It removes damaged glass material at the disk OD. (This includes glass material damaged by cutting or scribing and breaking the glass.)
2. This polishing step rounds the edges of substrates 110. The reason that the substrate edges are rounded can be understood by referring to FIG. 8. Referring to FIG. 8, roughly cylindrical polishing pad 120 polishes the OD of stack 122 of substrates 110. As can be seen, stack 122 comprises glass substrates 110 and protective layers 102. Protective layers 102 are typically made of softer material than substrates 110, and therefore wear more rapidly than substrates 110 in response to the polishing. As protective layers 102 wear, they expose the outer portions of the top and bottom surfaces of substrates 110 to the polishing slurry, thereby permitting the polishing slurry to polish the exposed portions and round the edges of the corners of substrates 110.

In FIGS. 7 and 8, one polishing pad is shown polishing the OD of stack 120 of substrates 110. However, in other embodiments, two or more pads can be used to simultaneously polish the OD of the stack. During this process, stack 120 can be rotated, e.g. in the direction of arrow A. Alternatively, the pads can rotate around stack 120. In addition, pad 122 can rotate about its central axis in the direction of arrow B.

Either before, after, or concurrently with the polishing of the OD of substrates 110, the ID of substrates 110 is subjected to a similar polishing process, using an elongated polishing pad (not shown), thereby rounding the corners of substrates 110 at their ID.

In this embodiment, the corners of substrates 110 are rounded, and not chamfered. Substrates having rounded corners function just as well as substrates with chamfered edges.

While FIGS. 7 and 8 show a stack of substrates 110 having their edges polished simultaneously, in another embodiment, the edges of substrates 110 are polished one at a time.

After polishing, substrates 110 are destacked, and the protective layers 102 are removed (step F). (As mentioned above, in one embodiment the material of layers 102 is water soluble, and layers 102 are removed with water.) Substrates 110 are then subjected to a minimal polishing step and cleaned (step G). This polishing step is designed to eliminate "waviness". Waviness is a high wavelength surface imperfection, e.g. a variation in flatness having a wavelength greater than the size of the read-write head used with the disk, e.g. a wavelength on the order of a few millimeters to 1 cm. Such polishing is described in U.S. patent application Ser. No. 09/262,365, filed Mar. 4, 1999 by Bajorek et al., incorporated herein by reference.

The minimal polishing step described above should not be confused with other prior art grinding, lapping and polishing steps used to remove damage caused during chamfering, cutting, stacking and destacking. (Grinding is an extremely aggressive process, typically involving a grinding stone. Lapping refers to an aggressive form of polishing, with either a free or fixed abrasive, which results in high material removal but creates an unacceptably rough surface finish. Polishing refers to a very fine form of material removal, typically with a free abrasive, that results in a very smooth surface finish.) During these prior art grinding, lapping and polishing steps, it is necessary to remove between 250 and 1000 μm of glass. In contrast, the above-described minimal polishing step typically removes less than about 100 μm and in one embodiment about 5 μm of glass or less. Thus, the polishing performed in the present invention is much less expensive than the grinding, lapping and polishing done in prior art processing steps.

A minimal polishing step, as described above, does not substantially disturb the short wavelength smoothness of the original glass sheet (e.g. having a Ra of about 1.5 Å). (Although the as-formed glass sheet produced by the float method has a low Ra, because the prior art processes damage the glass, the glass must be substantially polished to remove the damaged material and recreate a smooth surface. Because damage of the glass during manufacturing is avoided or reduced in the present invention, the initial smoothness of the glass is retained, and it is not necessary to subject substrates 110 to extensive polishing and lapping to recreate the initial smoothness.)

While the minimal polishing step is performed in one embodiment of the invention, in another embodiment, the minimal polishing step is not performed.

Optionally, at this point glass substrates 110 are subjected to chemical strengthening (step H). As is well known in the art, chemical strengthening is performed on Na-containing glass. During chemical strengthening, the substrates are immersed in a bath of a molten potassium (K) salt. Na ions diffuse out of the glass, while K ions diffuse into the glass. Since K ions have a greater diameter than Na ions, the K ions form a compression region adjacent the substrate surface, which prevents the propagation of cracks through the substrate, and results in a stronger substrate. After chemical strengthening, the glass substrate is cleaned.

Thereafter, substrates 110 are used to manufacture magnetic disks. This is typically accomplished by depositing an underlayer (e.g. Cr, a Cr alloy, NiAl, or NiP); a magnetic Co alloy; and a protective layer (e.g. carbon) onto the glass substrate. Deposition is typically accomplished by sputtering (step K). Details concerning one manufacturing process that can be used are set forth in U.S. patent application Ser. No. 08/894,753, filed by Bertero et al. on Dec. 4, 1997, incorporated herein by reference.

Figure 9:
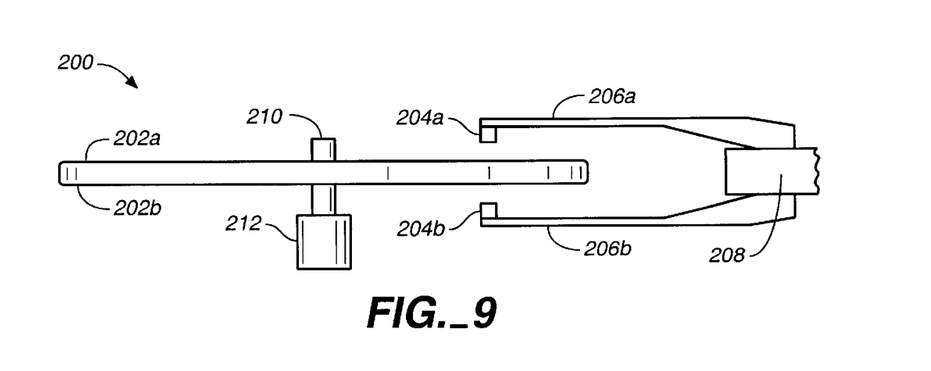
FIG. 9 illustrates a disk drive comprising a disk manufactured using a method in accordance with the present invention.

After the substrates are used to manufacture magnetic disks, the disks are provided in magnetic hard disk drives, e.g. disk drive 200 schematically shown in FIG. 9. Referring to FIG. 9, disk drive 200 comprises a magnetic disk 202 formed using a manufacturing process in accordance with the invention. Read-write heads 204a, 204b are held in proximity to top and bottom surfaces 202a, 202b of magnetic disk 202, respectively, by suspension arms 206a, 206b. Arms 206a, 206b are mounted on an actuator 208 so that heads 204 can be moved relative to disk 202, and so that heads 204 can access different tracks on disk 202.

Disk 202 is mounted on a spindle 210, which in turn is coupled to a motor 212 for rotating disk 202. During use, disk 202 is rotated, and heads 204a, 204b "fly" over an air cushion that forms in response to the rotation of disk 202.

II. Second Embodiment

Figure 10:
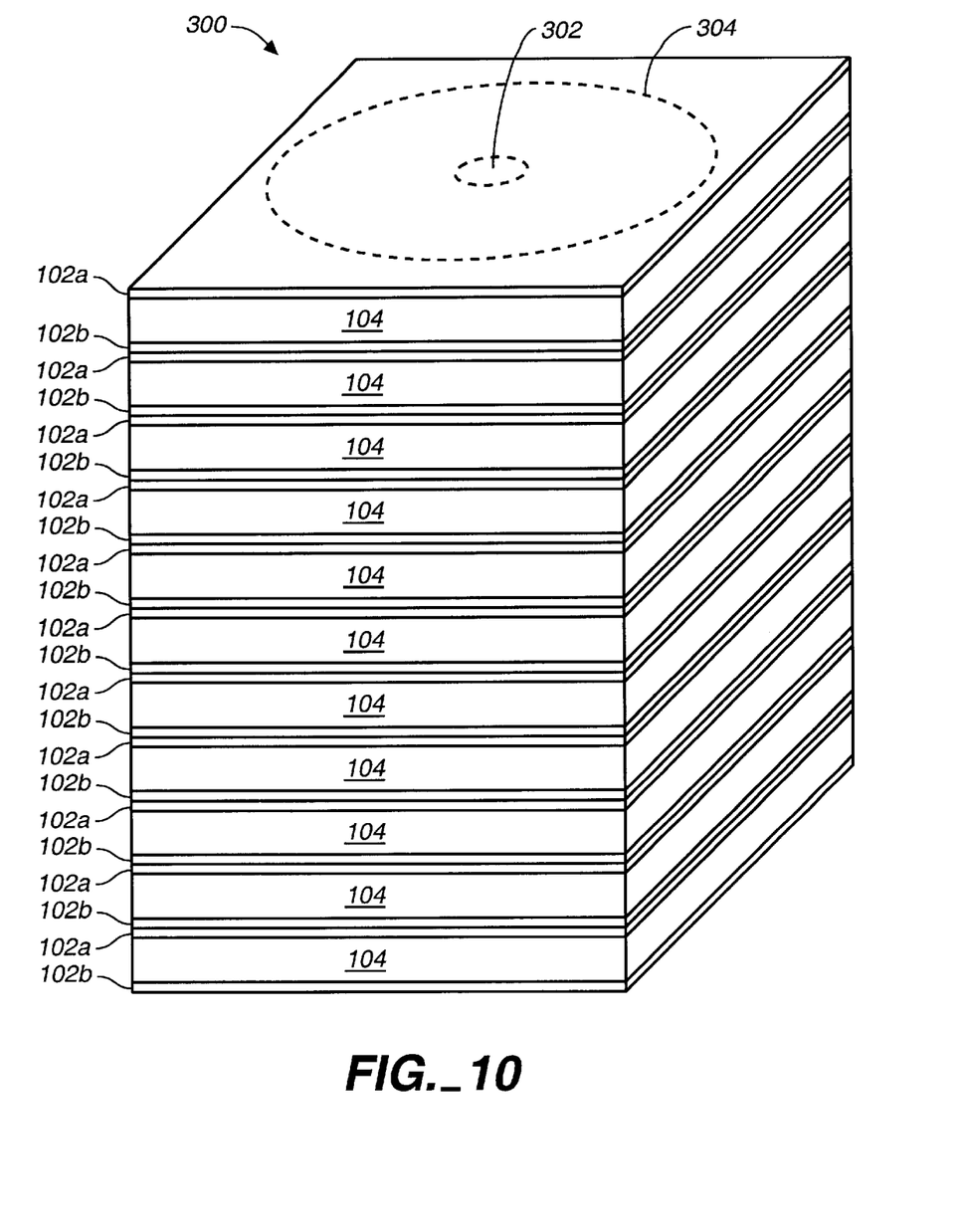
FIG. 10 illustrates a stack of glass squares assembled during a manufacturing process in accordance with a second embodiment of the invention.

In another embodiment of the invention, prior to cutting glass squares 104 into substrates, squares 104 are stacked to form stack 300 (FIG. 10). Squares 104 are optionally bonded together with an adhesive during stacking. Thus, a stack of glass squares can be processed simultaneously to minimize costs. (The adhesive used to bond squares 104 together can be the protective layer, e.g. protective layer 102. As in the embodiment discussed above, the adhesive that functions as a protective layer typically is designed to prevent damage due to the presence of particles between the workpieces. As mentioned above, use of an adhesive is particularly advantageous in this context.)

Next, the glass squares are subjected to a boring process during which a circular hole 302 (shown in phantom in FIG. 10) is drilled or bored through bonded squares 104. Hole 302 constitutes the ID of the glass substrates being manufactured. A second cutting tool cuts a circular section 304 (also shown in phantom in FIG. 10) out of stack 300 of glass squares 104. This circular section 304 constitutes a stack 122 of glass disk-shaped substrates 110 being manufactured. The drilling and cutting tools used during this part of the process are conventional.

Thereafter, stack 122 of glass substrates 110 are subjected to edge polishing as discussed above. After edge polishing, the substrates are destacked, and processing continues as discussed above. Of importance, protective layers 102 protect substrates 110 during stacking, cutting, edge polishing and destacking.

III. Third Embodiment

Figure 11:
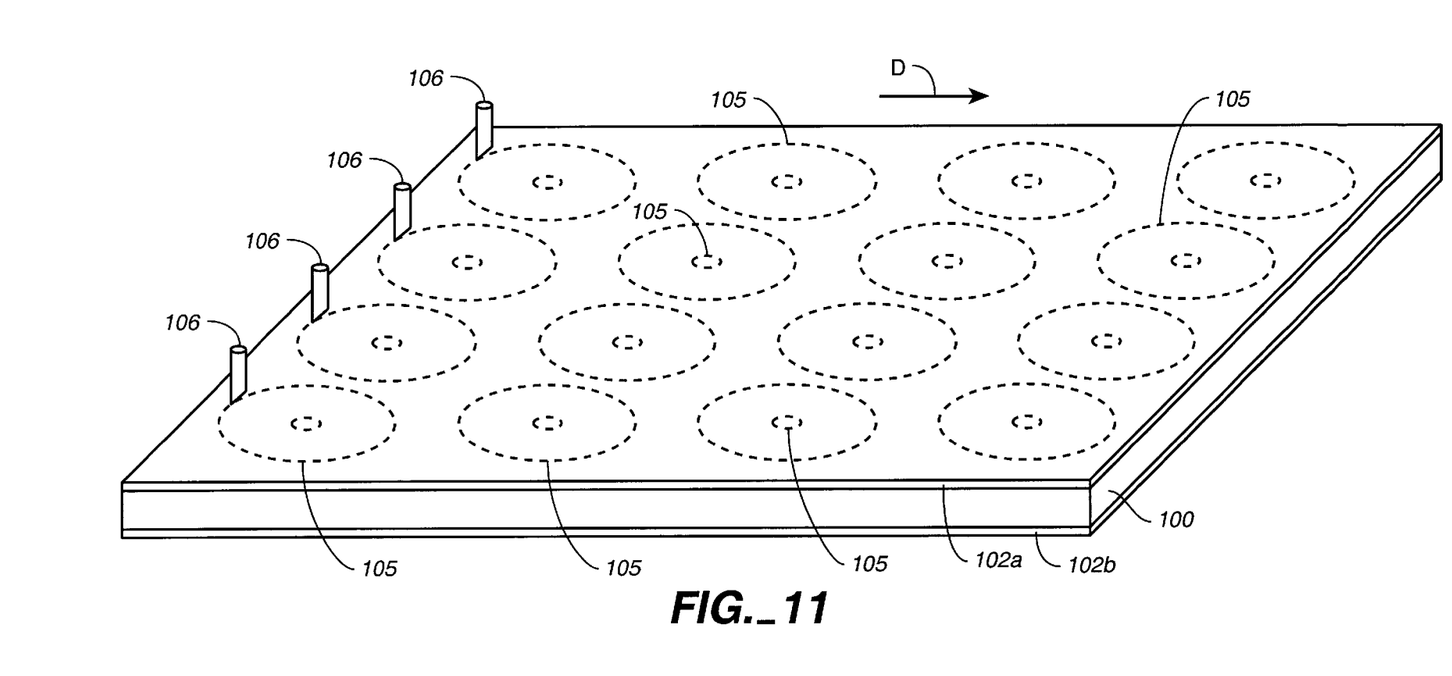
FIG. 11 illustrates a glass sheet being cut directly into substrates during a method in accordance with a third embodiment of the invention.

Referring to FIG. 11, glass sheet 100 is covered with protective layers 102. Instead of cutting sheet 100 into squares, and then cutting substrates out of the squares, glass substrates are cut directly out of glass sheet 100. This can be accomplished by sawing or scribing and breaking. In one embodiment, one or more laser beams traces out circular paths on glass sheet 100 to thereby scribe glass sheet 100 (see FIG. 11). (As in the previous embodiments, portions of protective layers 102 are burned through by the laser beams during this process step.) In another embodiment, one or more mechanical cutting tools, e.g. diamond scribing tools, scribes a set of circular regions of sheet 100. (The laser beams or scribing tools are schematically shown in FIG. 11 as 106.) These scribe lines, which define both the inner and outer diameters of the substrates, are shown in phantom in FIG. 11 as lines 105. Typically, a row of scribe lines are formed by scribing tools 106, sheet 100 is moved in direction D, and then another row of scribe lines are formed in sheet 100. (Although FIG. 11 shows only four sets of scribe lines formed in a row in sheet 100, in some embodiments, sheet 100 is many meters wide, and many sets of scribe lines are formed simultaneously in a row on sheet 100.)

In yet another embodiment, instead of using scribing tools or laser beams, a plurality of saws cut a plurality of circular regions of sheet 100. In either event, in this embodiment circular substrates are cut out of sheet 100 without first cutting the sheet into square workpieces 104.

For the case of scribing, both sides of glass sheet 100 can be scribed (either using a laser or mechanical scribing) to ensure well-defined substrate edges, e.g. as described in above-incorporated U.S. patent application Ser. No. 09/407,003. Also, for the case of laser scribing, glass sheet 100 can be subjected to an acidic solution comprising fluoride ions as described in above-incorporated U.S. patent application Ser. No. 09/407,630. Sheet 100 is then subjected to a breaking operation to form substrates 110.

After sheet 100 is cut into individual substrates 110, processing proceeds as discussed above. In other words, the substrates are stacked and subjected to edge polishing. The substrates are then destacked and processed as described above.

While the invention has been described with respect to specific embodiments, those skilled in the art will appreciate that changes can be made in form and detail without departing from the spirit and scope of the invention. For example, different techniques can be used to cut or break glass to form substrates. In addition, different types of materials other than glass-containing materials such as ceramic or other materials can be used in this invention. In lieu of the float method, different substrate manufacturing techniques can be used. In some embodiments, portions of the sheet of glass at its periphery are cut away and disposed of, rather than being used to manufacture substrates. Thus, substrates are not formed from the glass at the very edge of the glass sheet (e.g. if the edge of the glass sheet is poorer quality material). It should also be noted that different aspects and features of one embodiment of the invention described above can be practiced either independently or in combination with different aspects of the other embodiments described above. Accordingly, all such changes come within the invention.

I claim:

1. A method for manufacturing a substrate for a magnetic disk, comprising:

applying a protective overcoat over a sheet of material;

cutting the sheet of material into workpieces after said applying said protective overcoat;

stacking said workpieces on top of one another to form a stack of workpieces;

cutting said stack of workpieces to form a stack of circular disk substrates, said circular disk substrates being unchamfered, said substrate being one of said substrates within said stack;

polishing the corners and edges of the circular disk substrates within the stack, wherein the corners and edges of the substrate are rounded;

unstacking said stack of circular disk substrates; and removing said protective layer from each of said substrates.

2. Method of claim 1 wherein said protective overcoat is applied to both sides of said sheet of material.

3. Method of claim 1 wherein said protective overcoat is applied to only one side of said sheet of material.

4. Method of claim 1 wherein said sheet of material comprises glass.

5. Method of claim 4 wherein said material comprising glass is formed by the float method.

6. Method of claim 1 wherein said sheet of material is glass formed by drawing.

7. Method of claim 1 further comprising forming an underlayer, a magnetic layer and a protective overcoat on said substrates after removing said protective overcoat.

8. Method of claim 1 wherein said cutting of said workpiece into disk-shaped substrates comprises stacking said workpieces, cutting a central core through said stack to form the inner diameter of said substrates, and cutting away an outer wastepiece from said stack to thereby form the outer diameter of said substrates.

9. Method of claim 1 wherein said cutting of said workpieces into circular disk substrates comprises scribing and breaking said workpieces.

10. Method of claim 1 wherein said polishing comprises polishing the unchamfered edges of said stack of substrates while said substrates are stacked, such that during said act of polishing, the corners of stack of substrates are rounded, and at the conclusion of said polishing, the substrates comprise first and second major surfaces, a substantially cylindrical outer edge surface laterally surrounding said substrate, a first rounded corner between said first major surface and said outer edge surface, and a second rounded corner between said second major surface and said outer edge surface.

11. Method of claim 1 wherein a protective layer of material is provided between said substrates within said stack, said layer of material eroding more rapidly during polishing than the substrate material, and wherein a portion of the major surfaces of said substrates are exposed when said layer of material erodes, thereby exposing said portion of said major surface and causing said edges to be rounded during polishing.

12. A method for manufacturing a substrate for a magnetic disk comprising:

applying a protective overcoat over a sheet of material;

cutting the sheet of material into circular disk substrates, said substrates being unchamfered;

stacking said circular disk substrates on top of one another to form a stack of substrates;

polishing the corners and edges of the circular disk substrates within the stack, wherein the corners and edges of the substrates are rounded, unstacking said stack of circular disk substrates;

removing said protective layer from each of said substrates.

13. Method of claim 12 wherein said sheet of material comprises glass.

14. Method of claim 12 wherein said material comprising glass is formed by the float method.

15. Method of claim 12 wherein said sheet of material is glass formed by drawing.

16. Method of claim 12 further comprising forming an underlayer, a magnetic layer and a protective overcoat on said substrates after removing said protective overcoat.

17. Method of claim 12 wherein a protective layer of material is provided between said substrates within said stack, said layer of material eroding more rapidly during polishing than the substrate material, and wherein a portion of the major surfaces of said substrates are exposed when said layer of material erodes, thereby exposing said portion of said major surfaces and causing said edges to be rounded during polishing.

* * * * *